No. 702,080. Patented June 10, 1902.
M. C. SWEZEY.
STORE SERVICE APPARATUS.
(Application filed Apr. 1, 1902.)
(No Model.)
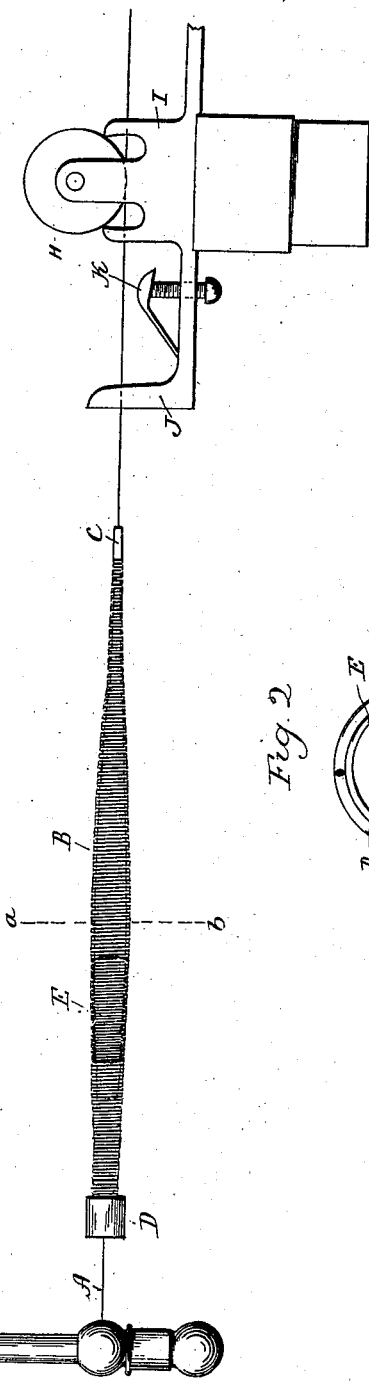
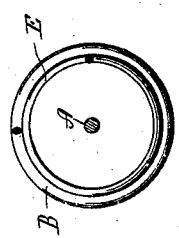
Fig. 1.
Fig. 2.
Witnesses: Moser C. Swezey
J. H. Shumway Inventor.
Clara L. Weed. By Attys Seymour & Earle

UNITED STATES PATENT OFFICE.

MOSES C. SWEZEY, OF WESTHAVEN, CONNECTICUT.

STORE-SERVICE APPARATUS.

SPECIFICATION forming part of Letters Patent No. 702,080, dated June 10, 1902.

Application filed April 1, 1902. Serial No. 100,951. (No model.)

*To all whom it may concern:*

Be it known that I, MOSES C. SWEZEY, of Westhaven, in the county of New Haven and State of Connecticut, have invented a new and useful Improvement in Store-Service Apparatus; and I do hereby declare the following, when taken in connection with the accompanying drawings and the letters of reference marked thereon, to be a full, clear, and exact description of the same, and which said drawings constitute part of this specification, and represent, in—

Figure 1, a side view, partially in section, of a store-service apparatus embodying my invention, the car or carrier being partially broken away; Fig. 2, a sectional view on the line *a b* of Fig. 1 and enlarged.

This invention relates to an improvement in a store-service apparatus—that is, a device for transporting cash or parcels from one part of the store to another—in which the car is propelled upon a track or way, and the invention more especially relates to improvements in devices previously patented to me and to which reference will be hereinafter made.

In United States Patent No. 398,356, granted to me February 19, 1889, is shown a store-service apparatus including a track-wire having near its termination a gradual enlargement formed by an overlay of wire wound thereon, said wire adapted to gradually stop a car traveling on said track, the car therein shown being a two-wheel car with stops or bearings at opposite ends of the car beyond the wheels, between which wheels and stops the enlargement extends, so as to stop the car as it passes onto the enlarged portion. In the device shown in this patent no provision was made for longitudinal movement of the spring.

In United States Patent No. 422,460, granted to me February 4, 1890, is shown a track-wire having a loosely-coiled spiral spring adapted to gradually stop the car, the spring being permitted a certain amount of longitudinal movement. In connection with the spring in this patent means were provided for elongating the spring and releasing it, whereby momentum was imparted to the car by the contraction of the spring, which threw it forward on the track.

In United States Patent No. 629,219, granted to me July 18, 1899, a car is shown comprising a single centrally-arranged wheel with notches or fingers at opposite ends of the frame, between which the track extends, and adjustable bearing-heads arranged between the wheel and the ends of the car, by means of which the car as it passes onto the enlarged portion of the wire will be gradually stopped.

My present improvement is adapted for cars or carriers like that shown and described in the last-mentioned patent. It also includes a tapering coiled spring rigidly secured at its outer end to the track-wire and so that the main portion of the spring may move longitudinally upon the wire, the object of the invention being to provide means for stopping the car more gradually and prevent the concussion which is liable to occur when the car is employed for carrying heavy parcels or when the track is inclined; and the invention consists in the construction and combinations of parts, as will be hereinafter described, and pointed out in the claims.

The track-wire A extends between two stations, such as the salesman and cashier or salesman and parcel-clerk, as the case may be. Upon the track is a coiled spring B, gradually tapering at opposite ends, its forward end being rigidly secured to the track by a clip C or other suitable means. At the inner end of the coil is a bumper D, of rubber or other suitable material, and this end terminates in its normal condition at a distance from the end of the wire. This coiled spring is wound upon a spindle in the usual manner; but before winding a core E, of wire or other suitable material, is placed or wound around the central portion of the spindle, so as to cause the coiled spring to taper in opposite directions. As shown in the accompanying drawings, the car or carrier illustrated is like that shown in the last-mentioned patent and comprises a bearing-wheel H, suitably mounted in a frame I, said frame having ends J, which extend upward on opposite sides of the track, and an adjustable yielding bearing-head K below the track and adapted to be raised or lowered to allow the car to pass to a greater or less extent or with more or less friction upon the spring B. Preferably this head will be adjusted so that by the momentum of the car the car will pass so far into the coil that the bearing-wheel H will have passed over its greatest diameter and so that the ends J will strike the bumper D, which will move rearward and elongate the spring. By thus permitting the spring to elongate the car is gradually stopped instead of coming against a fixed bumper, and the reaction of the spring will start the car forward; but owing to its retarded momentum it will remain upon the spring, the enlarged portion of which will stand between the bearing-wheel H and the bearing-head K. The core is more or less elastic and will contract to permit the car to pass over it when under great momentum and will expand and hold the same when it rebounds. By enlarging the coil-spring at the center the expansion of the spring takes place throughout the enlarged portion instead of at the ends. The life of the spring is thus materially prolonged.

While I have shown a car like that described in the patent granted to me, it is apparent that other forms of cars may be employed. In some cases, and where the device is used for cash-carriers only, the inner core E may be omitted.

Having thus described my invention, what I claim as new, and desire to secure by Letters Patent, is—

1. A store-service apparatus, a track-wire having near its termination an enlargement formed by a coiled spring, said coil tapering at opposite ends, the forward end rigidly secured to the track, and a bumper secured to the opposite end of the coil which is permitted to move longitudinally upon the wire substantially as described.

2. A store-service apparatus, a track-wire having near its termination an enlargement formed by a coiled spring, said coil tapering at opposite ends, the forward end rigidly secured to the track, a bumper secured to the opposite end of the coil which is permitted to move longitudinally upon the wire, and a core tapering at opposite ends arranged within the coil, substantially as described.

3. A store-service apparatus, a track-wire having near its termination an enlargement formed by a coiled spring, said coil tapering at opposite ends, the forward end rigidly secured to the track, a bumper secured to the opposite end of the coil which is permitted to move longitudinally upon the wire, and a core arranged within the coil, substantially as described.

In testimony whereof I have signed this specification in the presence of two subscribing witnesses.

MOSES C. SWEZEY.

Witnesses:
FREDERIC C. EARLE,
CLARA L. WEED.